United States Patent
Banerjee et al.

(10) Patent No.: US 11,283,278 B2
(45) Date of Patent: Mar. 22, 2022

(54) CLOSED LOOP HEADROOM MANAGEMENT FOR BATTERY CHARGING

(71) Applicant: Apple Inc., Cupertino, CA (US)

(72) Inventors: Soham Banerjee, Boulder, CO (US); Jeyakkrishnan Chengleput Srinivasan, Cupertino, CA (US); Kirill Kalinichev, San Francisco, CA (US); Antonio De Lima Fernandes, Santa Clara, CA (US); Jason Brinsfield, Mountain View, CA (US); Mary-Ann Ionascu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/664,274

(22) Filed: Oct. 25, 2019

(65) Prior Publication Data
US 2021/0126470 A1 Apr. 29, 2021

(51) Int. Cl.
*H02J 7/00* (2006.01)
*G06F 1/26* (2006.01)
*G06F 1/30* (2006.01)

(52) U.S. Cl.
CPC .............. *H02J 7/007* (2013.01); *G06F 1/266* (2013.01); *G06F 1/305* (2013.01); *H02J 7/0068* (2013.01)

(58) Field of Classification Search
CPC .... H02J 50/12; H02J 7/025; H02J 7/00; H02J 7/0068; H02J 50/80; H02J 7/0013; H02J 2310/22; H02J 2310/48; H02J 50/50; H02J 2310/40; H02J 5/005; H02J 7/00034; H02J 7/0027; H02J 7/0042; H02J 7/0044; H02J 7/0069; H02J 2310/44; H02J 50/005; H02J 7/00036; H02J 7/00041; H02J 7/00047; H02J 7/007; H02J 9/061; H02J 50/10; H02J 50/70; H02J 7/0045; H02J 7/00711; H02J 7/007184; H02J 50/402; H02J 50/502; H02J 50/60; H02J 7/0071; H02J 7/007182; H02J 7/35; B60L 2210/10; B60L 2210/20;
(Continued)

(56) References Cited

U.S. PATENT DOCUMENTS 9,362,768 B2 6/2016 Zhu
2015/0069957 A1* 3/2015 Chang .................. H02J 7/007
320/107
(Continued)

*Primary Examiner* — Binh C Tat
(74) *Attorney, Agent, or Firm* — Fletcher Yoder PC

(57) ABSTRACT

An electronic system can include a charged system and a charging system. The charged system can include a charger and a battery configured to be charged thereby. The charger may be configured to receive power from a charging system that includes a power converter configured to supply power to the charger and a controller configured to control the power converter. The controller may be configured to receive feedback information from the charged system, including one or more voltages. The controller may be further configured to determine an output voltage compensation value for the power converter as a function of the feedback information and to set an output voltage of the power converter as a function of the compensation value. The compensation value and output voltage may be selected to maintain a preselected headroom between a battery charging target voltage of the charger and a voltage supplied to the charger.

16 Claims, 5 Drawing Sheets

(58) Field of Classification Search
CPC ... B60L 2210/30; G01R 31/36; G01R 31/382; H01F 38/14
USPC .................................................. 320/106–123
See application file for complete search history.

(56) References Cited

U.S. PATENT DOCUMENTS

| | | | |
|---|---|---|---|
| 2015/0130292 A1* | 5/2015 | Yeon | G05F 1/62 307/104 |
| 2015/0340908 A1* | 11/2015 | Chambon | H02J 7/0068 307/66 |
| 2018/0129234 A1 | 5/2018 | Melgar | |

* cited by examiner

CLOSED LOOP HEADROOM MANAGEMENT FOR BATTERY CHARGING

BACKGROUND

Modern consumers employ a wide variety of personal electronic devices that are powered by batteries. As a general principle, it is desirable to charge these batteries as efficiently as possible. In some embodiments, such efficiency requirements may be heightened. For example, it is becoming common for consumers to charge the batteries of one device from another battery powered device. One example is wireless earphones (also called "ear buds"), which may be charged from a storage case that includes a battery of its own. Other examples include charging smartphones, tablet computers, and the like from a laptop computer, or charging these and other devices from a portable power bank, etc. In these applications, because of the finite amount of charge available in charging device, maximizing the efficiency of charging of the charged device can improve the number of charges the charged device can receive, thereby extending its usable time.

In some embodiments, charging a battery can include providing a constant current until the battery reaches a certain state of charge, and then providing a constant voltage until the battery reaches a further certain state of charge. In the constant current phase, the voltage required/supplied to drive the constant current will increase as the battery's state of charge increases. To the extent that the input voltage provided to the charger is significantly greater than the required battery charging voltage, significant inefficiencies may be introduced. However, providing a voltage less than required to meet the battery charging profile can result in longer than necessary charge times. Thus, what is needed in the art are systems and methods for maintaining a voltage supplied to a battery charger of a portable electronic device at a level sufficiently above the required battery target voltage to maintain the desired rate of charging, but not so high as to introduce the aforementioned inefficiencies.

SUMMARY

An electronic system can include a charged system and a charging system. The charged system can include at least one charger and at least one battery configured to be charged by the at least one charger. The at least one charger may be configured to receive power from a charging system. The charging system can include a power converter configured to supply power to the at least one charger of the charged system and a controller configured to control the power converter. The controller may be configured to receive feedback information from the charged system, the feedback information including one or more voltages of the charged system. The controller may be further configured to determine an output voltage compensation value for the power converter as a function of the feedback information. The controller may be still further configured to set an output voltage of the power converter as a function of the compensation value, wherein the compensation value and output voltage are selected to maintain a preselected headroom between a battery charging target voltage of the charger and a voltage supplied to the charger.

The charged system may include a plurality of batteries and a plurality of chargers. The one or more voltages of the charged system may include at least an input voltage of the at least one charger and an output voltage of the at least one charger. The charged system may further include at least one low dropout regulator or at least one switch coupled between an input of the at least one charger and at least one power contact of the charged system. The charged system may include one or more wireless earphones.

The charging system may further include one or more switches coupled between an output of the power converter and one or more power contacts of the charging system. The charging system may further include a power source configured to provide power to the power converter. The power source may be coupled to a battery within the charging system, or the power source may be coupled to an external power source by a wired and/or a wireless connection.

A method of supplying power to a battery charger of a charged system, for charging a battery of the charged system, can include receiving, at a controller of a charging system, feedback information from the charged system, the feedback information including one or more voltages of the charged system. The method can further include determining, by the controller of the charging system, an output voltage compensation value for a power converter of the charged system as a function of the feedback information, the power converter being configured to deliver power to the battery charger. The method can still further include setting, by the controller, an output voltage of the power converter as a function of the compensation value, wherein the compensation value and output voltage are selected to maintain a preselected headroom between a battery charging target voltage of the charger and a voltage supplied to the charger.

The charged system may include a plurality of batteries and a plurality of chargers. The one or more voltages of the charged system include at least an input voltage of the at least one charger and an output voltage of the at least one charger. Determining, by the controller of the charging system, an output voltage compensation value for a power converter of the charged system as a function of the feedback information may include determining whether data received from the charged system is valid. Determining, by the controller of the charging system, an output voltage compensation value for a power converter of the charged system as a function of the feedback information comprises determining whether data received from the charged system is valid may further include setting the charged system status to one of a plurality of states responsive to the feedback information. The compensation value may be selected from a plurality of predetermined compensation levels. The predetermined compensation values include a plurality of positive values, at least one negative value, and a zero value. The charged system may include one or more wireless earphones, and the charged system may include a charging case.

An electronic system can include at least one battery, at least one charger configured to charge the at least one battery, and a power converter configured to deliver power to the at least one battery. The electronic system can further include means for regulating an output voltage of the power converter so that the output voltage maintains a preselected headroom above a charging target voltage of the at least one charger.

DETAILED DESCRIPTION

Figure 1:
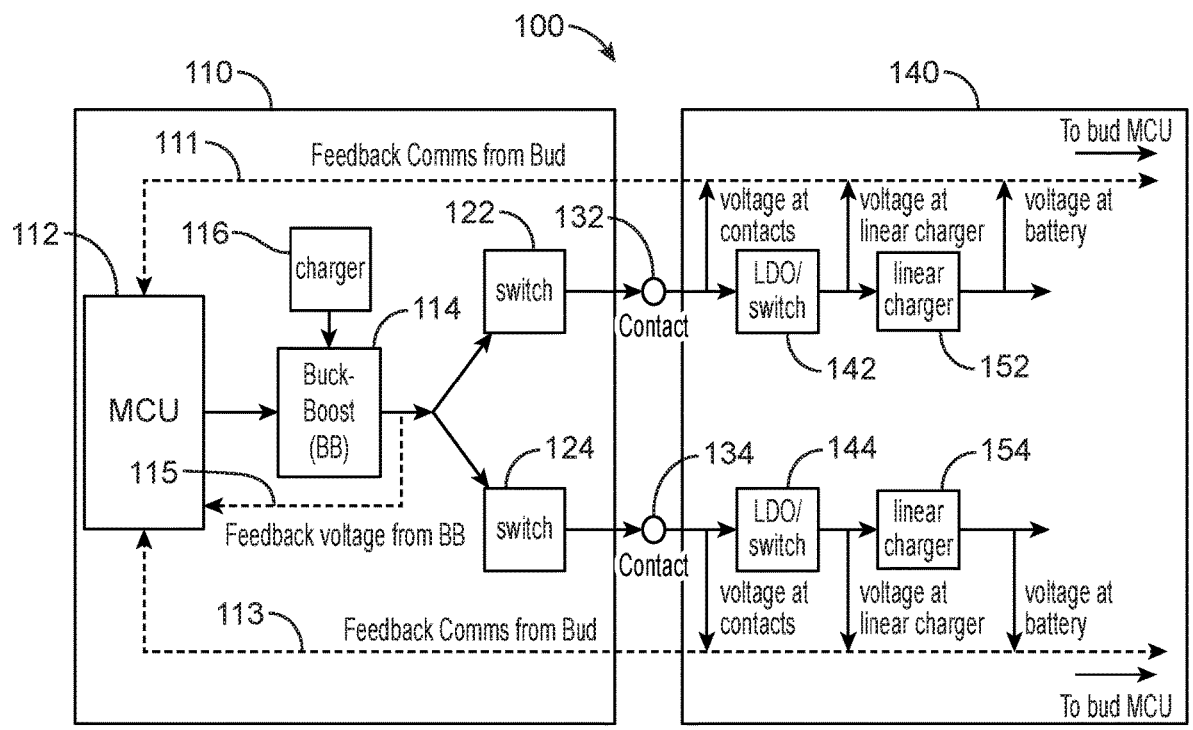
FIG. 1 illustrates a block diagram of a battery charging system that may employ closed loop headroom management.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates an exemplary system 100, including a charging device 110 supplies power to a charged device 140. In the illustrated embodiment, charged system 140 may include a pair of wireless earphones/ear buds. Charging device 110 may be a charging case for those wireless earphones. The devices and techniques described herein are not limited to that particular application. Rather, they may be used in any application in which a controllable voltage is supplied to a battery charger and it is desired to minimize inefficiency associated with differences between that controllable supplied voltage and the battery charging target voltage.

With further reference to FIG. 1, charging device 110 may include a controller 112. This controller may be a microcontroller, microprocessor, or other suitable electronic control unit for directing operation of the other charging system components. Controller 112 may receive feedback from the charged device 140 that may be used to assist with control of the charging process as described further below. In the illustrated embodiment, controller 112 receives feedback from a first earphone via feedback path 111 and receives feedback from a second earphone via a feedback path 113. In other embodiments, controller 112 may receive feedback from any number of charged devices or systems, such feedback being sued to control the charging process as described in greater detail below.

Controller 112 may be coupled to and direct the operation of a power converter 114. Power converter 114 may convert a voltage received from a power source 116 to another voltage suitable for delivery to charged system 140. In the illustrated embodiment, converter 114 is a buck-boost converter, meaning that it is capable of providing either a stepped-up (boosted) output voltage (i.e., the voltage supplied to charged system 140 is greater than the voltage supplied by power source 116) or a stepped-down (bucked) output voltage (i.e., the voltage supplied to charged system 140 is less than the voltage supplied by power source 116). Numerous power converter topologies, including buck-boost and other topologies, as well as their basic operating principles, are known to those skilled in the art. Any such converters may be used in conjunction with the teachings herein as appropriate for a particular application.

Power converter 114 receives power from power source 116. In the illustrated embodiment, power source 116 may be a charger in a battery case for a wireless earphone set. Such charger may be configured to deliver power to power converter 114 from one or more power sources. Such power sources could include, for example, a battery internal to charged system 110, a wired external power source connected to charged system 110, or a wireless (inductive) power transfer source coupled to charged system 110. Power source/charger 116 may also be configured to deliver power from a wired and/or a wireless external power source to a battery contained within charged system 110. In other embodiments, other types or combinations of power sources may be used as appropriate.

As noted above, controller 112 directs the operation of power converter 114. To do so effectively, controller 114 may receive a feedback signal corresponding to the output of power converter 114. For example, controller 112 may receive feedback corresponding to the output of power converter 114 along feedback 115. This feedback may be used by controller 112 to direct the charging operation as described in greater detail below. The output of power converter 114 may also be supplied to optional switches 124 and 124, which may be configured to selectively deliver power to charged system 140. In the illustrated embodiment, two switches 122 and 124 are provided, each corresponding to one of the wireless earphones making up charged system 140. However, in other applications, other numbers of switches may be provided as appropriate. These switches may be used to selectively connect and disconnect the loads to be charged as appropriate (e.g., as determined controller 112).

Switches 122 and 124 may couple to contacts 132 and 134, respectively. These contacts may include conductive elements in charging system 110 that are configured to come in contact with corresponding conductive elements in charged system 140. For example, if charging system 110 is a charging case for wireless earphones, there may be metallic contacts in the case that are configured to come in physical (and therefore electrical) contact with corresponding metallic contacts on the earphones themselves. The resulting electrical current path may provide a path for charging the battery(ies) in charged system 140. Additionally, in some embodiments these contacts or additional electrical contacts may provide the path for feedback signals from the charged system to controller 112. In other embodiments, the feedback paths may be provided by an alternative physical path, such as wireless communication paths using Bluetooth, WiFi, inductive coupling, or other suitable wireless communication medium.

In the illustrated example, charged system 140 may, as noted above, be a pair of wireless earphones. In other embodiments, any personal electronic device(s) having a battery(ies) to be charged may be substituted. FIG. 1 omits the load/battery from the drawing. However, FIG. 1 does show a power flow path that includes low dropout regulators (LDOs)/switches 142 and 144, chargers 152 and 154, and various feedback voltages provided to controller 112. More specifically, for each load in charged system 140, the voltage at the contacts 132 and 134, which is also the input voltage to LDOs/switches 142 and 144 may be provided to controller 112. Additionally, the output voltages of LDOs/switches 142 and 144, which are also the input voltages to chargers 152 and 154 may be provided to controller 112. Finally, the output voltages of chargers 152 and 154 may be provided to controller 112. It is these latter voltages that may be provided to the battery(ies) of charged system 140. Charged system 140 may also include its own controller (not shown) that may monitor one or more of the aforementioned voltages and/or communicate them back to controller 112 via feedback paths 111 and 113.

With further reference to FIG. 1, LDOs/switches 142 and 140 may receive the voltage from contacts 132 and 134, respectively. This voltage will approximately correspond to the output voltage of power converter 114, less any drop along the path. LDOs/switches 142 and 144 may regulate this voltage down to a suitable level for input into chargers 152 and 154 as discussed above. LDOs/switches 142 and 144 may be controlled by a controller of charged system 140 (not shown), and may also be used to disconnect the batter(ies)/load(s) as appropriate. Chargers 152 and 154 may receive the output voltage of LDOs/switches 142 and 144 and generate a suitable battery target voltage as described in greater detail below. In some embodiments, chargers 152 and 154 may be linear chargers. The foregoing description has been based on the illustrated example of charged system 140 being a pair of wireless earphones, with charged system 110 being a charging case for such earphones. However, it should be appreciated that any of a variety of charging systems and charged systems could still be used with the techniques described herein.

Figure 2:
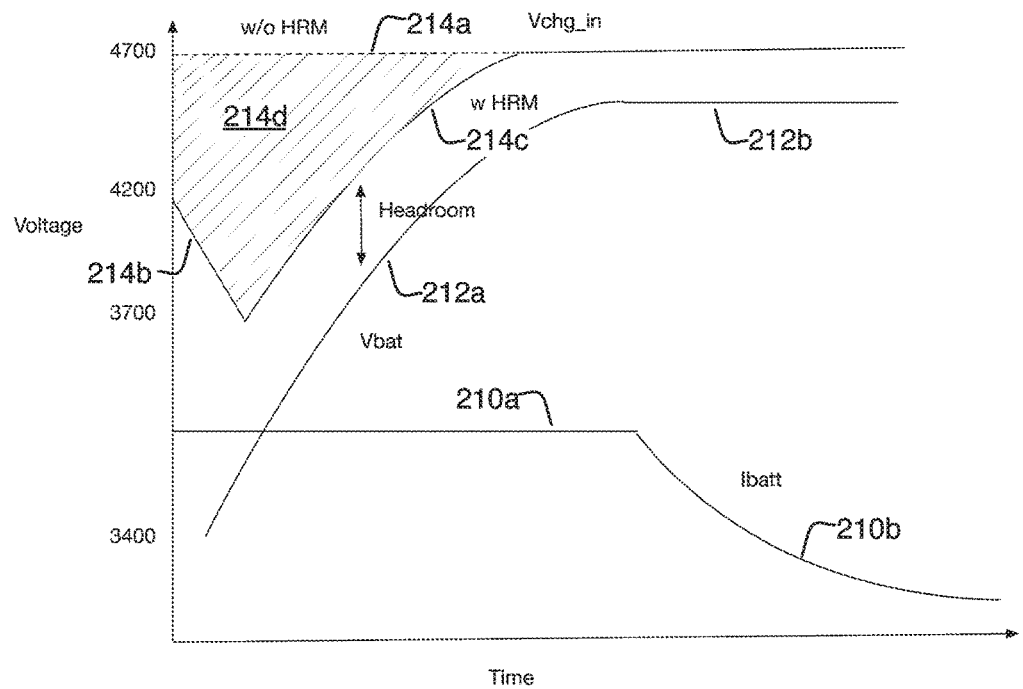
FIG. 2 illustrates plots of voltages and currents associated with a battery charging operation including closed loop headroom management.

FIG. 2 illustrates pertinent voltage and current waveforms associated with an exemplary battery charging operation. For example, the waveforms may be those corresponding to charging a battery of one earphone of a set of wireless earphones. In other embodiments, any load could be used. Current into the battery is illustrated by curve 210, which includes a constant current portion 210a (corresponding to a constant current battery charging operation) and a decaying current portion 210b (corresponding to a constant voltage battery charging operations). In many embodiments, particularly those involving lithium ion batteries, a battery may be charged with one or more constant current charging operations each followed by a constant voltage charging operation. Although the curves of FIG. 2 illustrate just one constant current interval followed by one constant voltage interval, it should be understood that multiple such intervals could also be employed with the teaching herein.

Curve 212 depicts a corresponding battery voltage during the same charging operations. During the initial, constant current charging phase 221a, the battery voltage increases as the battery state of charge increases (to maintain a constant charging current). Battery voltage 212 may be provided by charger 152 or 154, and may be regulated to maintain the desired constant charging current 210a. Once the battery reaches a predetermined charge level, the battery charging voltage may become a constant voltage 212b, which will produce the decreasing battery charging current 210b discussed above. Curve 214 may depicts a charger input voltage (such as the output of LDO/switch 142 or 144) that may be provided to the charger. In previous devices, a constant voltage 214a might be provided to the input of the charger. Conversely, in conjunction with the teachings herein, a variable voltage 214b/214c may be provided, which maintains a relatively smaller headroom above the battery target voltage discussed above. As a result, the losses corresponding to hatched region 214d may be eliminated. These losses not only waste energy that could otherwise be used for the functions of the respective devices, but can also cause undesirable heating that may damage/shorten the life of the various battery cells. At a high level, battery charging voltage headroom management can include bringing a charger input voltage within a predetermined headroom from the battery target voltage (as illustrated by curve 214b) and then maintaining the battery charger input voltage offset by the predetermined headroom amount from the battery charging voltage (as illustrated by curve 214c). What follows below is a description of one approach to doing so in the context of the system depicted above with respect to FIG. 1.

Figure 3:
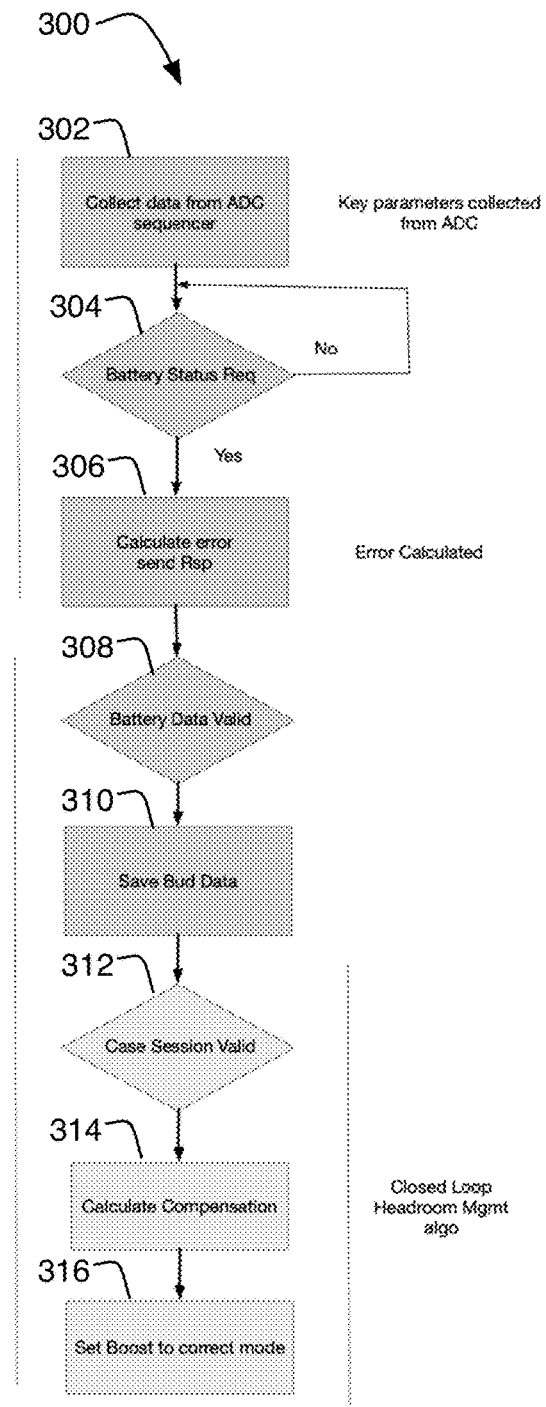
FIG. 3 illustrates a high level flow chart of a control system for the charging system of FIG. 1 employing closed loop headroom management.

FIG. 3 illustrates a flow chart of a control technique 300 that may be executed by one or more controllers, such as controller 112, to implement a battery charging voltage headroom management system. Although described in the context of the system described above with respect to FIG. 1, control technique 300 may also be used with devices and systems other than wireless earphones. Beginning with block 302, a controller in charged system 140 (or other suitable controller of a given system) may collect data from an analog to digital converter about the status of the various components of the system, including the status of any battery(ies) in charged system 140, as well as various system voltages. The battery status information may include information such as battery voltage, temperature, state of charge, and the like for the battery(ies) of charged system 140. In the illustrated example, these are the batteries of the respective earphones, but, in other systems, the status of any applicable battery can be recorded. In addition to the battery status information, control block 302 may also include collection of pertinent system voltages, such as the feedback voltages discussed above with respect to FIG. 1. More particularly, the collected information can include the voltage at the contacts 132 and 134 (which is also the input voltage to LDOs/switches 142 and 144), the output voltages of LDOs/switches 142 and 144 (which are also the input voltages to chargers 152 and 154), and the output voltages of chargers 152 and 154 (which are provided to the batteries). This and other appropriate data may be collected at any suitable interval. In at least some embodiments, it may be desirable to average some number of recently collected values to provide a suitable level of filtering.

As this data is collected, the controller in charged system 140 (or other suitable controller) may determine (in block 304) whether a status request has been received from another controller in the overall system, such as controller 112 in the charging system. In some embodiments, all of control technique 300 could be implemented in a single controller, in which case the inter-controller communication steps of control technique 300 may be eliminated. Otherwise, in the illustrated multi-controller embodiment, the charged system controller (not shown) may wait until it receives the status request from the other controller. Once received, control may proceed to block 306, in which a controller (not shown) of charged system 140 may compute an error signal (discussed in greater detail below) and send the error signal, along with other pertinent information, such as battery status, to another controller, such as controller 112.

In the illustrated embodiment, the remaining blocks 308-316 of control technique 300 may be performed by controller 112 in charging system 110. However, to reiterate, the particular division of monitoring, control, and computation illustrated herein should not be construed as limiting, as the charging headroom management techniques described herein may be implemented in any of a variety of suitable controller architectures. Nonetheless, in the illustrated embodiment, the battery data, including the error signal, may be sent to controller 112, which may (in block 308) determine whether the data received is valid. Any of a variety of tests may be performed for this validity check. Assuming the battery data is valid, the received data may be saved (block 310). Then, in block 312, it may be determined whether the session status (described in greater detail below) is valid. If so, control may proceed to block 314 in which the appropriate battery voltage headroom compensation is determined (as described in greater detail below). Once the compensation is determined, power converter 114 may be set to the correct mode (according to the required compensation).

Figure 4A:
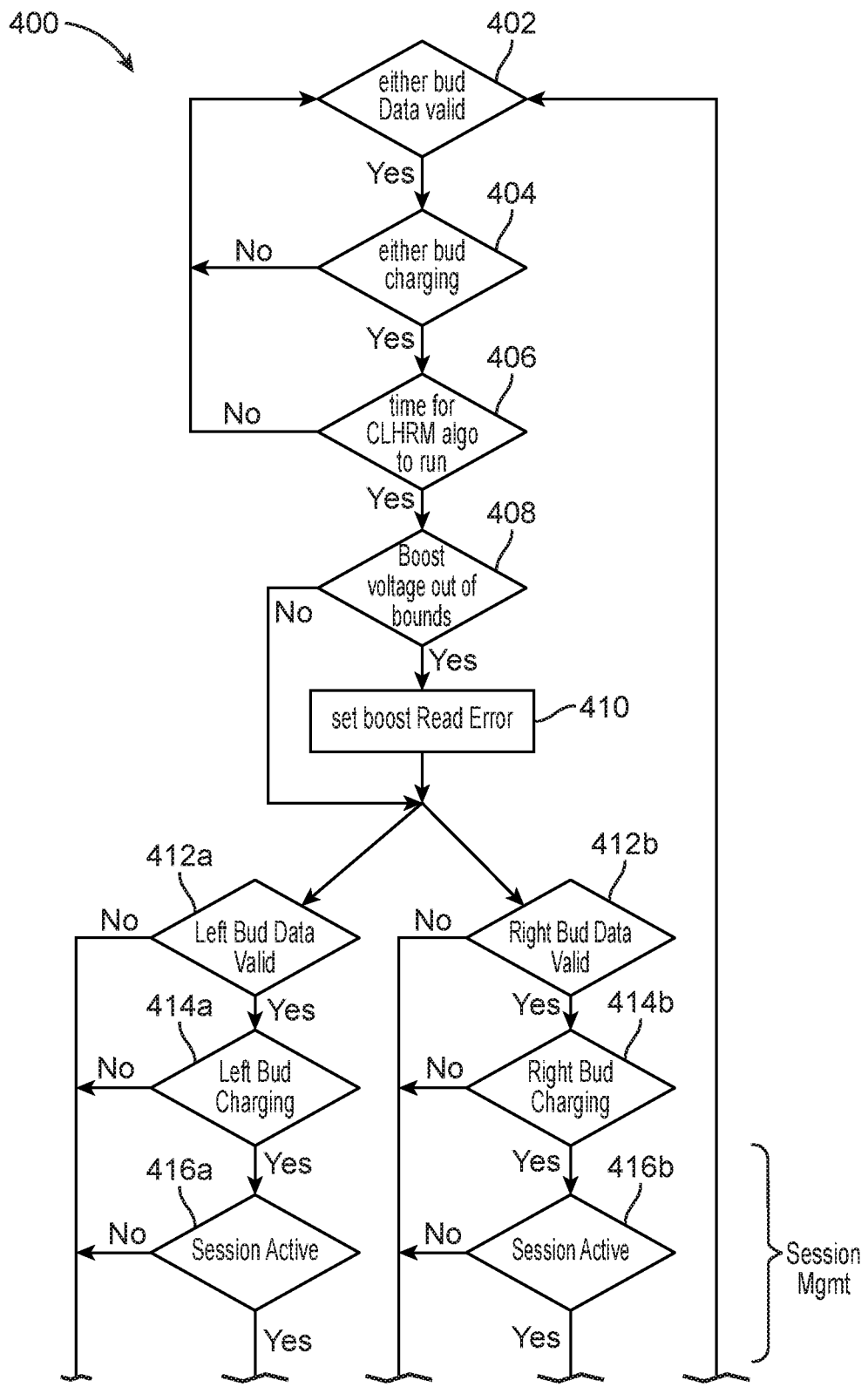
FIGS. 4A and 4B illustrate a more detailed flow chart of a control system for the charging system of FIG. 1 employing closed loop headroom management.
Figure 4B:
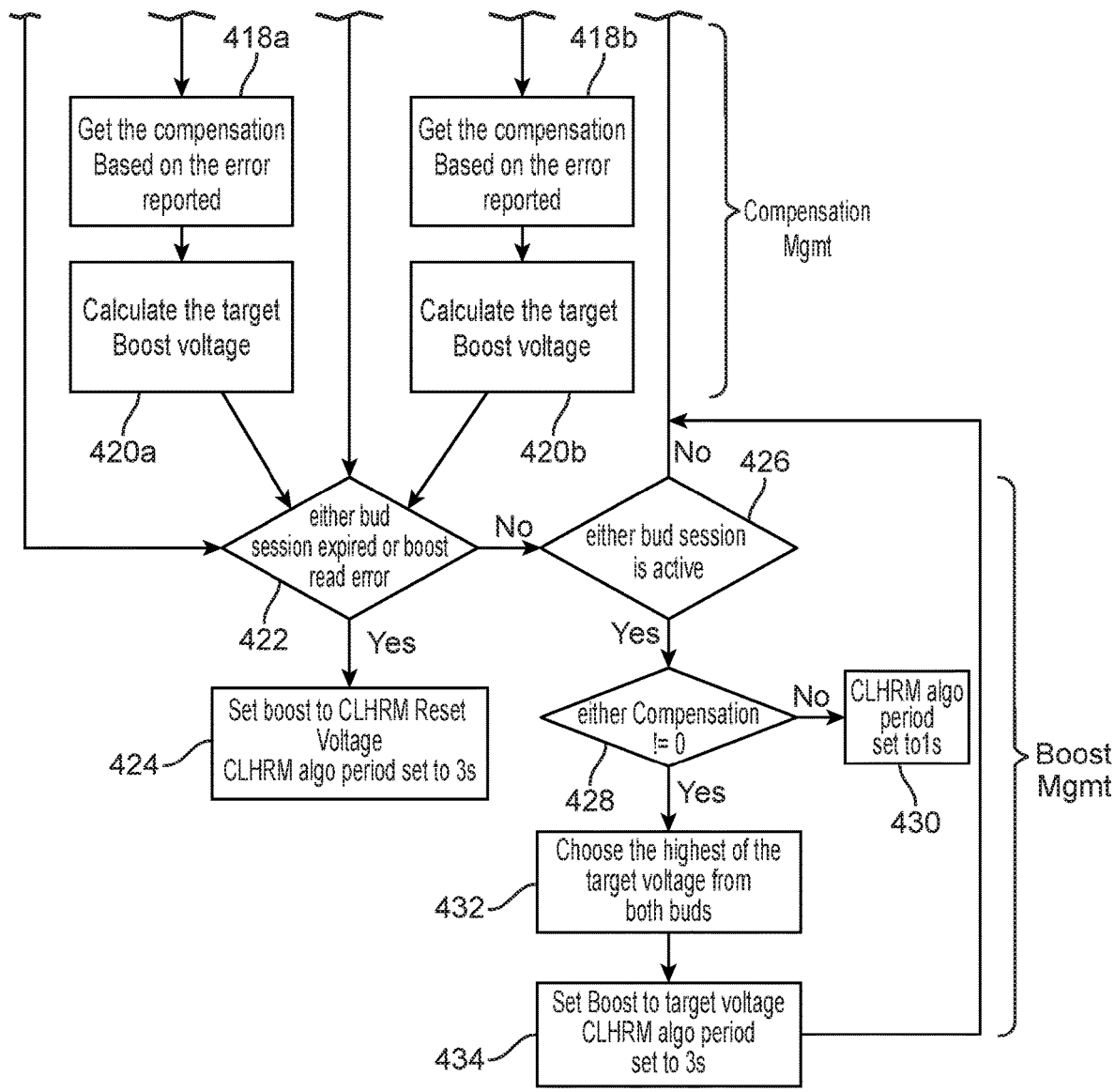

FIGS. 4A and 4B illustrate an expanded flow chart illustrating in greater detail the operations associated with blocks 312-316 discussed above. Beginning in block 402, controller 112 (or other suitable controller) may wait to determine whether valid data is received from charged system 140. In the illustrated embodiment relating to a pair of wireless earphones, block 402 can be determined in the affirmative if either of the earphones is returning valid data. This concept may be extended such that in any multi-device charged system, control may proceed when any of the batteries is returning valid data. However, in some multi-device charged system embodiments, it may be desirable to wait to determine whether all batteries are returning valid data before proceeding. For a single device system, control may proceed when the single battery is returning valid data.

Once valid data is being returned, in block 404, it is determined whether either/any connected device (e.g., either of the wireless earphones) is charging. If not, control may return to block 402, as there is no need to implement the charging voltage headroom management technique if the battery(ies) are not charging. Otherwise, if at least one battery of charged system 140 is charging, it may be determined in block 406 whether it is time for the closed loop headroom management algorithm to run. In at least some embodiments, it may be desirable to prevent the algorithm from running continuously, as it will take some time for the battery(ies) and other system components to respond to compensation changes made by the algorithm. Thus, a suitable update interval may be implemented to prevent continuous chasing of an appropriate compensation value.

If it is time for the closed loop headroom management algorithm to run, it may be determined in block 408 whether the output of power converter 114 is out of bounds, meaning that the output of the converter is outside some predetermined range. For example, in one embodiment, a range of 3.8V to 5V may be considered to be appropriate. If the voltage is not out of bounds, control may proceed to blocks 412a/412b discussed below. If it is determined that the voltage is out of bounds, a power converter read error flag may be set in block 410 (referenced again with respect to block 422, below), at which point control may proceed to blocks 412a/412b.

Blocks 412a-420a and 412b-420b correspond to respective left and right wireless earphones of the illustrated embodiment and describe calculating a required compensation level for the closed loop headroom management technique. These blocks are the same for each earphone, and corresponding loads would employ similar steps. These steps are thus described together. Beginning in block 412a/412b, it may be determined whether the data coming from each battery/load of charged system 140 is valid data. If not, i.e., if the data is invalid, then control may bypass blocks 414a/414b-420a/420b and proceed to block 422, discussed in greater detail below. If so, it may be determined in block 414a/414b whether either battery is charging. If not, i.e., if neither earphone is charging, then control may bypass blocks 416a/416b-420a/420b and proceed to block 422, discussed in greater detail below. Otherwise, if it is determined in blocks 414a/414b that the corresponding battery is charging, control may proceed to block 416a/416b, in which it may be determined whether a session is active.

Use of sessions for closed loop headroom management is described in greater detail below. If in block 416a/416b, it is determined that the session is not valid, then control may bypass blocks 418a/418b-420a/420b and proceed to block 422, discussed in greater detail below. Otherwise, if it is determined in block 416a/416b that the session is valid, control may pass to blocks 418a/418b, in which the error reported by the charged system (discussed above) may be used to determine an appropriate compensation level as described in greater detail below. Control may then proceed to block 420a/420b, in which the target voltage for converter 114 may be determined (using the determined compensation).

Control then passes to block 422. In block 422, it is determined whether a charged system session has expired or if there has been a converter read error (block 410, discussed above). If either of these conditions are true, the closed loop headroom algorithm should gracefully terminate. Thus, the output voltage of converter 114 may be set to its reset value, i.e., some nominal value that provides appropriate battery charging in all circumstances. Additionally but optionally, a delay period may be set before running through the algorithm again (block 424). Otherwise, if the session is not expired and there is no converter out of bounds error, control may pass to block 426.

In block 426, it may be determined whether any of the battery(ies)/load(s) of charged system 140 are in an active session. (Again, sessions for controlling the algorithm are discussed in greater detail below.) If no charged system battery is in active session, control may return to block 402, i.e., the beginning of the algorithm. Otherwise, if either battery/load of charged system 140 is in an active session, control may pass to block 428, in which it is determined whether a required compensation for either path (i.e., either earphone) is non-zero. If not, meaning the determined compensation in block 418a and 418b is equal to zero, control may return to block 402, i.e., the beginning of the algorithm, via block 430, in which a delay (e.g., 1 second) may be set before running through the algorithm again. Otherwise, if at least one path determines a non-zero compensation value, control may pass to block 432, in which the highest target voltage (corresponding to the largest compensation) may be selected and the output of converter 114 may be set to this largest target voltage in block 434. Additionally, control may return to the beginning of the algorithm (block 402) with a suitable delay before rerunning the algorithm (e.g., 3 seconds).

Figure 6:
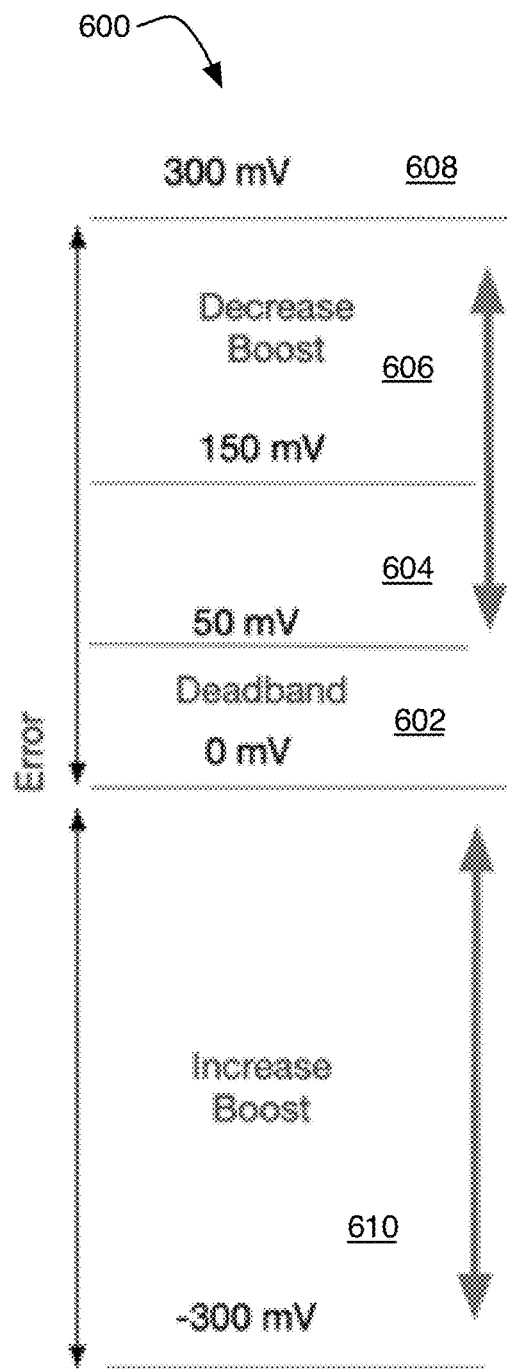
FIG. 6 illustrates a series of voltage states and error signals for a system employing closed loop headroom management.
Figure 5:
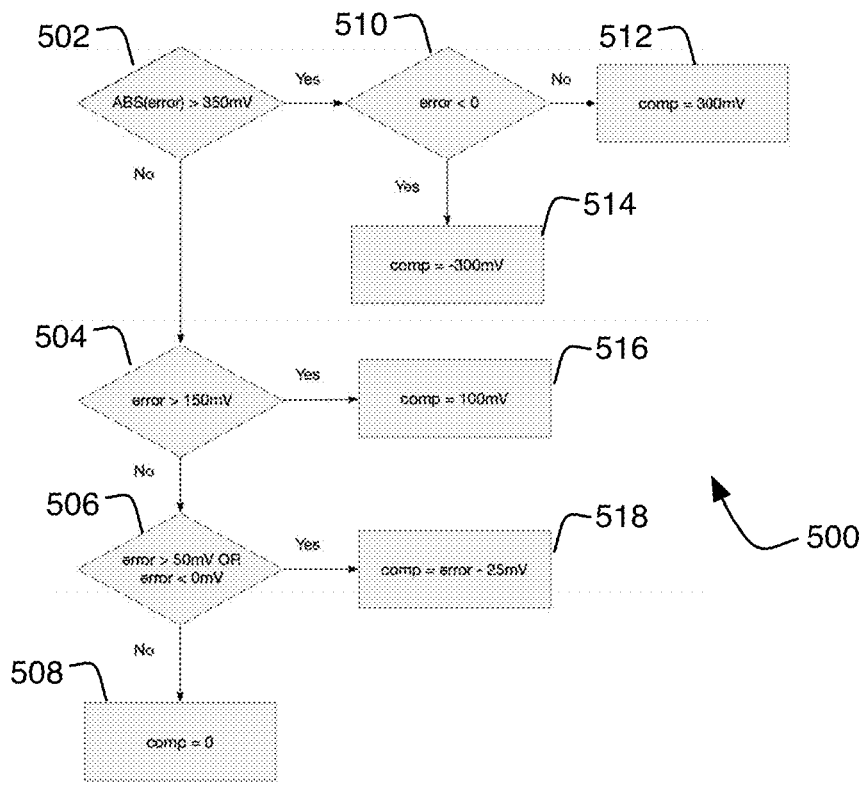
FIG. 5 illustrates a flow chart for determining compensation responsive to the error signal in a closed loop headroom management algorithm.

FIGS. 5 and 6 depict the determination of a suitable compensation level. FIG. 6 depicts a series of increased/decreased power converter output voltage levels as a function of an error signal, which are discussed in greater detail below. FIG. 5 is a flow chart depicting a technique 500 for selecting among various compensation levels, which may be thought of as an expansion of blocks 418a/418b and 420a/420b.

With reference to FIG. 5, the technique begins in block 502, in which it is determined whether the absolute value of an error signal seen by the charged system is greater than a threshold (e.g., 350 mV). Different thresholds may be selected depending on the particular application. The error signal may be determined as the input voltage provided to power converter 114, less the rail voltage of charging system 110, less the sum of: (a) headroom associated LDOs/switches 142, (b) headroom associated with chargers 152, and a required margin or headroom level above the battery charging target voltage (e.g., the Headroom depicted in FIG. 2). In other words, the error signal is intended to compensate for the voltage drops along the power path from power source 116, through converter 114 and other intervening components before the battery of charged system 140, plus the added headroom. In some embodiments, the margin/headroom may be about 25-35 mV. Depending on the exact construction of the system, different error computations may be used, with the understanding that the overall idea is to offset the output voltage of converter 114 (or a corresponding converter) to compensate for voltage drops along the path to the charged battery along with a predetermined headroom margin.

If in block 502, it is determined that the absolute value of the error signal is greater than some first threshold (e.g., 350 mV), then control may pass to block 510 in which it is determined whether the error is positive or negative. If the error is negative, then the compensation may be set to a predetermined maximum negative value, e.g., −300 mV. Alternatively, if the error is positive, then the compensation may be set to a predetermined maximum positive value, e.g., 300 mV. These can correspond to regions 608 and 610 in FIG. 6. In other words, if the error signal has a large positive value, the voltage supplied is significantly greater than that required to maintain suitably efficient minimal headroom above the target voltage. As a result, the output voltage of converter 114 may be reduced by a relatively large increment. On the other hand, if the error signal has a large negative value, the voltage supplied may be significantly less than that required to maintain suitable headroom above the target voltage, slowing charging, and the output voltage of converter 114 may be increased by a relatively large increment to increase the headroom.

Alternatively, if in block 502 it is determined that the absolute value of the error signal is less than the first threshold (e.g., 350 mV), then control may pass to block 504 in which it is determined whether the error is greater than a second, intermediate, threshold, e.g., 150 mV. If so, the compensation may be set to an intermediate value (block 516). In other words, if the error signal is relatively large, i.e., greater than the second threshold but less than the first threshold, then the voltage supplied may be somewhat greater than that required to maintain suitably efficient headroom above the target voltage, and the output voltage of converter 114 may be reduced by an intermediate increment to decrease the headroom. This corresponds to region 606 in FIG. 6.

Alternatively, if in block 504 it is determined that the value of the error signal is less than the second threshold, control may pass to block 506 in which it may be determined whether the error is greater than a third minimal threshold or less than zero. If not, meaning the error is a small positive value, control may pass to block 508 in which the compensation is set to zero. This corresponds to dead band region 602 in FIG. 6. In other words, if the error signal is relatively small, then the output voltage of converter 114 is near a value that provides for sufficient headroom but maximal efficiency in battery charging. Also, in this region there may be other limitations on the control circuit, such as analog to digital converter (ADC) accuracy, etc. Alternatively, if in block 506 it is determined that the error signal is either greater than the third minimal threshold or negative, control may pass to block 518, in which the compensation value may be set to the value of the error signal −25 mV or any other margin value that is selected depending on the particulars of a given system.

The foregoing description of FIGS. 5 and 6 is based on a series of three thresholds and a corresponding range of small, intermediate, and large compensation values. It will be appreciated that in any particular application, more or fewer thresholds and compensation values could be used as appropriate. In general, the point of the compensation determination is to determine how far the system is from a suitably efficient minimal headroom, where suitable efficiency may be determined based on the objectives and specific parameters of a specific design. If the headroom provided to the charger is greater than what is required, it should be steered towards the suitably efficient value to maximize efficiency. If the delta from the optimal value is large, the system may be steered with relatively large compensation steps. If the delta from the optimal value is relatively small, the system may be steered with relatively smaller compensation steps. On the other hand, if insufficient headroom is provided, then the system should be steered to provide at least the minimum amount of headroom to maximize the rate at which the battery may be charged without creating undue efficiency penalties and the resulting risk of heat damage to the system.

Figure 7:
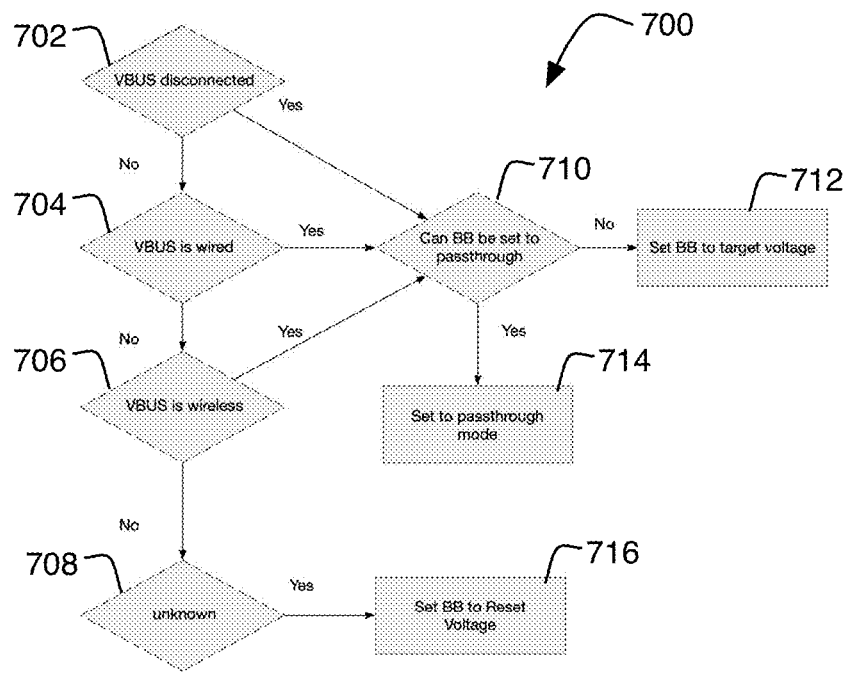
FIG. 7 illustrates a flow chart for controlling a buck/boost converter in a charging system employing closed loop headroom management.

FIG. 7 illustrates a flow chart 700 of a technique for controlling the output voltage of converter 114 (or a corresponding converter in a similar system). At block 702, it may be determined whether the input power source 116 of converter 114 is disconnected from any external source (e.g., is connected only to an internal battery of charging system 110). If so, control may proceed to block 710, discussed in greater detail below. Alternatively, if in block 702 it is determined that the input power source 116 of converter 114 is not disconnected from any external power source, it may be determined in block 704 if it is connected to wired external power source. If so, control may proceed to block 710 discussed in greater detail below. Alternatively, if it is determined in block 704 that power source 116 is not connected to a wired power source, it may be determined in block 706 whether it is connected to a wireless power source. If so, control may pass to block 710 discussed in greater detail below. Otherwise, control may pass to block 708 (indicating an unknown connection of input power source 116), which may trigger a setting of power converter 114 to its default output voltage (block 716). This may correspond to an error condition where some issue with the system has resulted in a situation where the output voltage of the converter is not at a suitable value for charging and everything may be reset to a normal state for recovery of normal operation.

Alternatively, if in any of the aforementioned blocks 702, 704, or 706, it is determined which power source converter 114 is coupled to, it may be determined in block 710 whether power converter 114 may be set in a passthrough mode. In the pass through mode, the input voltage (from the connected source, whether battery, wired, or wireless) may be passed directly through converter 114 which may operate without switching. This is only feasible if the voltage input into converter 114 is approximately equal to the charging voltage required by the battery. If so, passing this voltage through converter 114 without switching (block 714) may allow for more efficient operation than if converter 114 were actually converting the output voltage. Alternatively, if it is not feasible to set converter 114 in a passthrough mode, converter 114's output voltage may be set to the target voltage determined in accordance with the procedures described above.

As discussed above with respect to blocks 312 (FIGS. 3), 416a, 416b, and 426, a session status may be used to keep track of the state of charging of the battery(ies) in charged system 140. These session statuses may be implemented, for example, as various states of a state machine implemented in controller 112 (or other suitable location). Depending on the details of an implementation, various numbers of states may be provided, having different meanings. In one embodiment, relating to the wireless earphone example described herein, there may be a total of four states. These four states may be an inactive state (state 0), an in progress state (state 1), an active state (state 2), and an expired state (state 3). As but one non-limiting example, relating to the wireless earphones embodiment, an inactive state may be set when the wireless earphones are not in the charging case, meaning that the battery(ies) of charged system 140 are not available for charging. Similarly, an in progress state may be set when the last battery data received is older than a threshold, but the timeout conditions for rerunning the algorithm have not yet been met. In the in progress state, a previously determined compensation value and corresponding converter output voltage may be being applied to the battery(ies) of charged system 140. An active state may be set when the battery data is relatively new, but has not yet been acted upon to determine a compensation level and corresponding converter output voltage, in other words while the algorithm is determining a suitable compensation level and corresponding converter output voltage. Finally, an expired state may be set when the data from the charged system is stale and the timeout condition has been met, meaning it is time to rerun the algorithm to determine a compensation level and correspond converter output voltage level.

The aforementioned states are just one example of states that may be used to determine whether a controller (e.g., controller 112) of a charging system has valid data from a charged system 140 that may be used to determine an appropriate compensation level and corresponding converter output voltage to maintain closed loop headroom control of one or more chargers 152/154 of charged system 140. IN general, any tracking technique for making sure that valid data is being received and that valid outputs are being generated may be used, bearing in mind the overall goals of: (1) charging the battery(ies) of the charged system, (2) in such a way that maximizes efficiency and minimizes the risks of thermal damage, while (3) charging as rapidly as possible.

Described above are various features and embodiments relating to closed loop headroom management for a battery charging system. Such systems may be used in a variety of applications but may be particularly advantageous when used in conjunction with personal electronic devices for which it is desired to maximize efficiency of a battery charging operation while minimizing the risks of thermal damage to the batteries. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An electronic system, comprising:
at least one wireless earphone including at least one charger and at least one battery configured to be charged by the at least one charger, wherein the at least one charger receives power from a charging case;
a charging case comprising a power converter configured to supply power to the at least one charger of the wireless earphone and a controller configured to control the power converter; the controller being configured to:
receive feedback information from the wireless earphone, the feedback information including one or more voltages of the wireless earphone;
determine an output voltage compensation value for the power converter as a function of the feedback information; and
set an output voltage of the power converter as a function of the compensation value, wherein the compensation value and output voltage are selected to maintain a preselected headroom between a battery charging target voltage of the charger and a voltage supplied to the charger.

2. The electronic system of claim 1 wherein the at least one wireless earphone comprises two wireless earphones.

3. The electronic system of claim 1 wherein the one or more voltages of the wireless earphone include at least an input voltage of the at least one charger and an output voltage of the at least one charger.

4. The electronic system of claim 1 wherein the wireless earphone further includes at least one low dropout regulator or at least one switch coupled between an input of the at least one charger and at least one power contact of the at least one wireless earphone.

5. The electronic system of claim 1 wherein the charging case further includes one or more switches coupled between an output of the power converter and one or more power contacts of the charging case.

6. The electronic system of claim 1 wherein the charging case further includes a power source configured to provide power to the power converter.

7. The electronic system of claim 6 wherein the power source is coupled to a battery within the charging case.

8. The electronic system of claim 6 wherein the power source is configured to be coupled to an external power source by a wired connection.

9. The electronic system of claim 6 wherein the power source is configured to be coupled to an external power source by a wireless connection.

10. A method of supplying power to a battery charger of at least one wireless earphone for charging a battery of the wireless earphone, the method comprising:
  receiving, at a controller of charging case, feedback information from the wireless earphone, the feedback information including one or more voltages of the wireless earphone;
  determining, by the controller of the charging case, an output voltage compensation value for a power converter of the charging case as a function of the feedback information, the power converter being configured to deliver power to the battery charger of the at least one wireless earphone; and
  setting, by the controller, an output voltage of the power converter as a function of the compensation value, wherein the compensation value and output voltage are selected to maintain a preselected headroom between a battery charging target voltage of the charger and a voltage supplied to the charger.

11. The method of claim 10 wherein the at least one wireless earphone comprises two wireless earphones.

12. The method of claim 10 wherein the one or more voltages of the wireless earphone include at least an input voltage of the battery charger and an output voltage of the battery charger.

13. The method of claim 10 wherein determining, by the controller of the charging case, an output voltage compensation value for a power converter of the charging case as a function of the feedback information comprises determining whether data received from the wireless earphone is valid.

14. The method of claim 13 wherein determining, by the controller of the charging case, an output voltage compensation value for a power converter of the charging case as a function of the feedback information comprises determining whether data received from the wireless earphone is valid further comprises setting the wireless earphone status to one of a plurality of states responsive to the feedback information.

15. The method of claim 10 wherein the compensation value is selected from a plurality of predetermined compensation levels.

16. The method of claim 15 wherein the predetermined compensation values include a plurality of positive values, at least one negative value, and a zero value.

* * * * *